(12) United States Patent
Ji

(10) Patent No.: US 8,644,251 B2
(45) Date of Patent: Feb. 4, 2014

(54) SYSTEM AND METHOD FOR PERFORMING A HANDOVER IN AN ENHANCED MULTICAST BROADCAST SYSTEM (E-MBS)

(75) Inventor: Baowei Ji, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1414 days.

(21) Appl. No.: 12/321,538

(22) Filed: Jan. 22, 2009

(65) Prior Publication Data

US 2010/0061338 A1 Mar. 11, 2010

Related U.S. Application Data

(60) Provisional application No. 61/191,087, filed on Sep. 5, 2008.

(51) Int. Cl.
*H04W 4/00* (2009.01)
(52) U.S. Cl.
USPC .......................................................... 370/331

(58) Field of Classification Search
USPC ........................... 370/331, 332; 455/426, 427
See application file for complete search history.

(56) References Cited

U.S. PATENT DOCUMENTS

| 5,950,127 | A  | * | 9/1999 | Nitta et al. | 455/428 |
| 7,103,020 | B2 | * | 9/2006 | Eriksson et al. | 370/328 |
| 2008/0084818 | A1 | * | 4/2008 | Yoon et al. | 370/210 |
| 2009/0073933 | A1 | * | 3/2009 | Madour et al. | 370/331 |
| 2009/0219849 | A1 | * | 9/2009 | Alpert et al. | 370/312 |

* cited by examiner

*Primary Examiner* — Derrick Ferris
*Assistant Examiner* — Farhad Ali

(57) ABSTRACT

A wireless communication network comprising a plurality of base stations capable of wireless communication with a plurality of subscriber stations within a coverage area of the network, wherein at least one of the plurality of base stations is capable of transmitting an edge-zone indicator which indicates the proximity of the at least one base station to an edge of an enhanced multicast broadcast system (E-MBS) zone.

21 Claims, 7 Drawing Sheets

US 8,644,251 B2

SYSTEM AND METHOD FOR PERFORMING A HANDOVER IN AN ENHANCED MULTICAST BROADCAST SYSTEM (E-MBS)

CROSS-REFERENCE TO RELATED APPLICATION(S) AND CLAIM OF PRIORITY

The present application is related to U.S. Provisional Patent No. 61/191,087, filed Aug. 5, 2008, entitled "METHOD FOR INTER-EMBS-ZONE HANDOVER". Provisional Patent No. 61/191,087 is assigned to the assignee of the present application and is hereby incorporated by reference into the present application as if fully set forth herein. The present application hereby claims priority under 35 U.S.C. §119(e) to U.S. Provisional Patent No. 61/191,087.

TECHNICAL FIELD OF THE INVENTION

The present application relates generally to wireless communications and, more specifically, to a technique for performing a handover between neighbor broadcast zones in an enhanced multicast broadcast system (E-MBS).

BACKGROUND OF THE INVENTION

The IEEE 802.16e standard describes Multicast and Broadcast Services (MBS), which is a downlink only offering that uses common multicast connection identifiers (MCIDs) to provide an efficient method of simultaneously transmitting data to a group of users. Thus, MBS saves resources by allocating the same radio waveform to all users registered to the same service instead of allocating as many radio waveforms as there are users. Moreover, in a multi-base station (multi-BS) MBS system, mobile stations (MSs) registered to an MBS service can receive MBS information from any base station (BS) in a particular MBS_ZONE without being registered with a specific BS in that zone.

Although the IEEE 802.16m standard for E-MBS consists of MAC and PHY protocols defining interactions between the MSs and the BSs, no detailed description has been provided on how to carry out a handover among different multicast and broadcast zones in MBS. Similarly, no detailed description has been provided on how to carry out a handover among different multicast and broadcast zones in other systems such as Evolved Universal Terrestrial Radio Access Network (E-UTRAN), or Ultra Mobile Broadband (UMB).

Accordingly, there is a need in the art for a system and method for handling a handover among different multicast and broadcast zones.

SUMMARY OF THE INVENTION

A wireless communication network comprising a plurality of base stations capable of wireless communication with a plurality of subscriber stations within a coverage area of the network, wherein at least one of the plurality of base stations is capable of transmitting an edge-zone indicator which indicates the proximity of the at least one base station to an edge of an enhanced multicast broadcast system (E-MBS) zone.

A base station capable of wireless communication with a plurality of subscriber stations within a coverage area of a network, where the base station is capable of transmitting an edge-zone indicator which indicates the proximity of the at least one base station to an edge of an enhanced multicast broadcast system (E-MBS) zone.

A method of operating a base station comprising transmitting an edge-zone indicator which indicates the proximity of the at least one base station to an edge of an enhanced multicast broadcast system (E-MBS) zone.

A mobile station capable of receiving an edge-zone indicator and determining the proximity of the mobile station to an edge of an enhanced multicast broadcast system (E-MBS) zone based upon a value of the edge-zone indicator.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
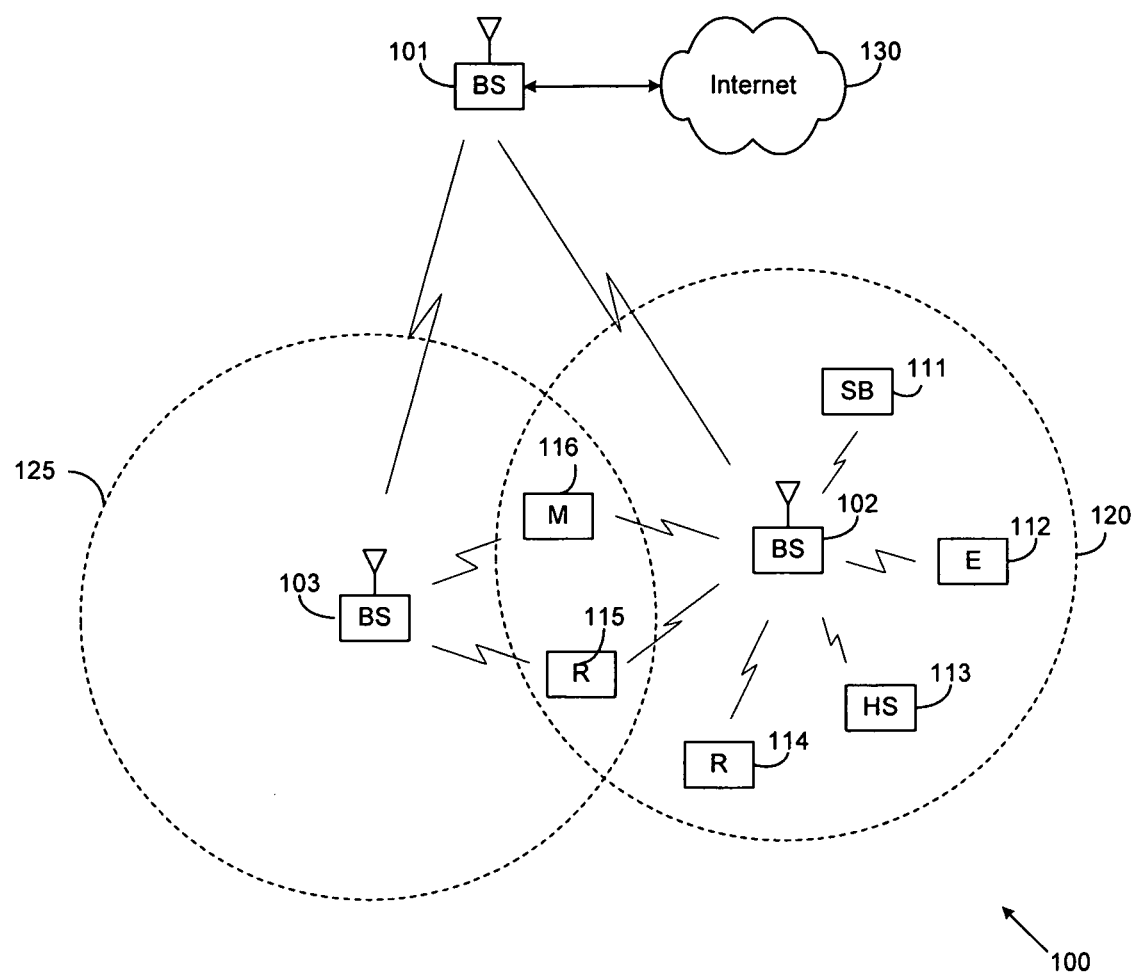
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
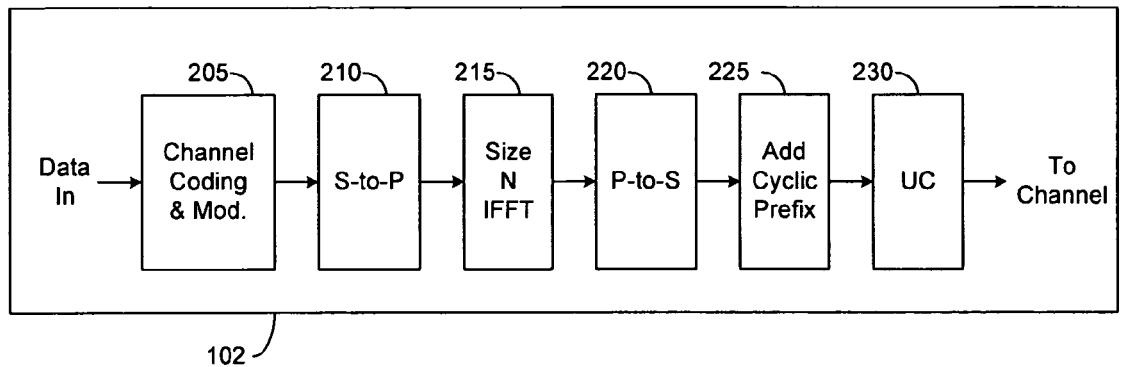
FIG. 2A is a high-level diagram of an OFDMA transmitter according to one embodiment of the present disclosure.
Figure 2B:
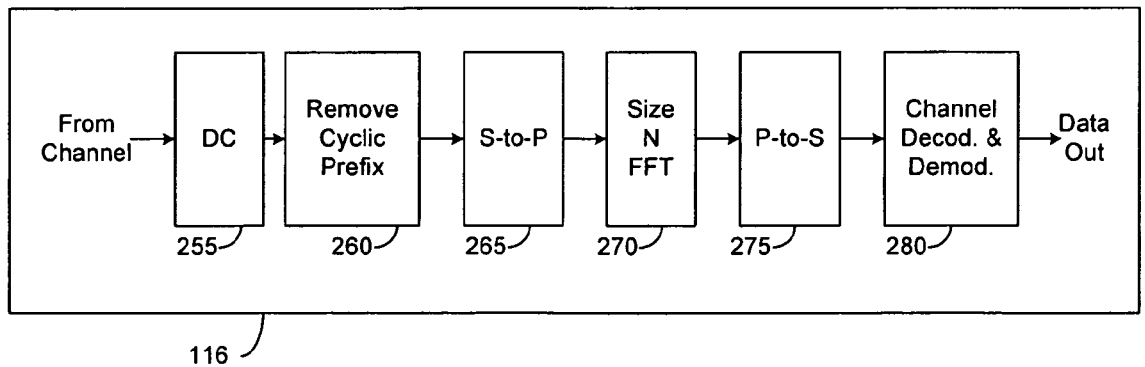
FIG. 2B is a high-level diagram of an OFDMA receiver according to one embodiment of the present disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes a system and method for performing a handover between neighbor broadcast zones in an enhanced multicast broadcast system (E-MBS).

Figure 3:
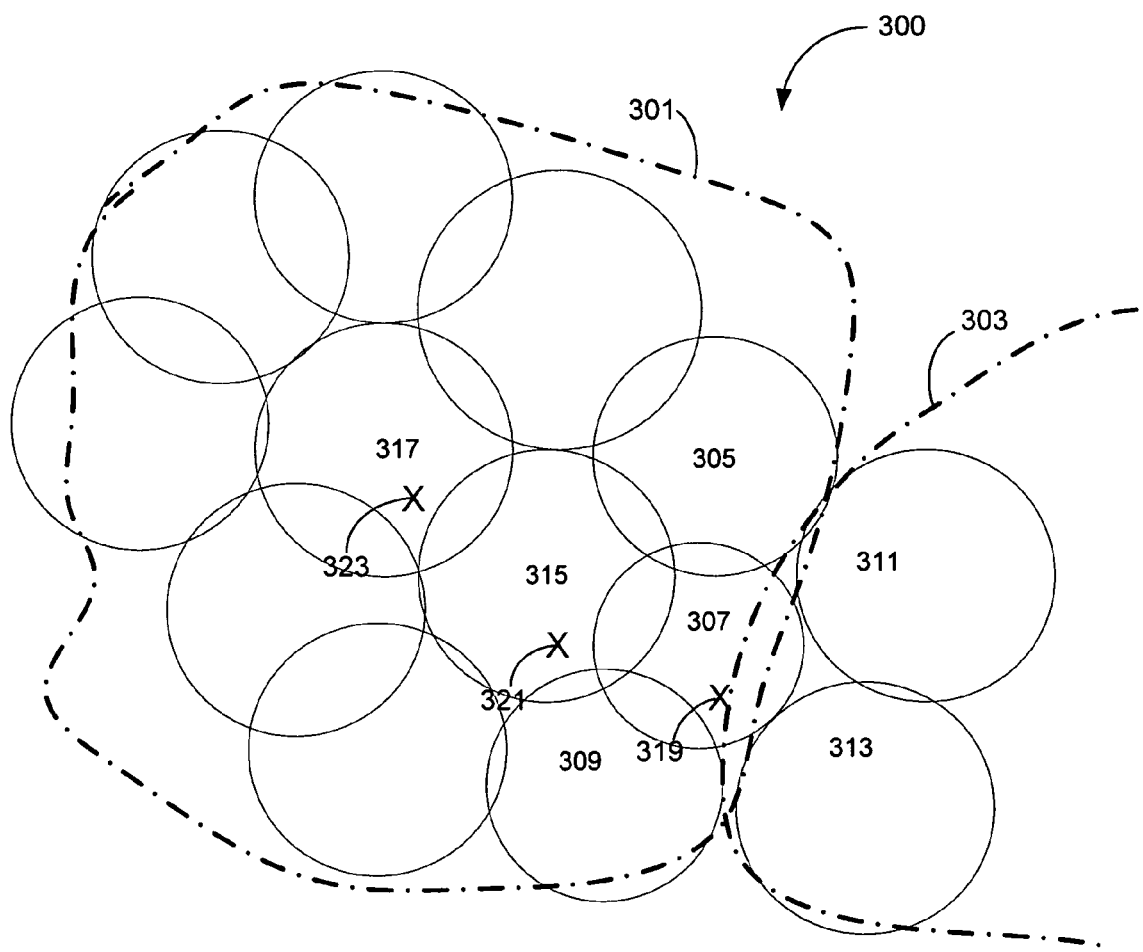
FIG. 3 illustrates an enhanced multicast broadcast system (E-MBS) according to an embodiment of the present disclosure.

FIG. 3 illustrates an enhanced multicast broadcast system (E-MBS) 300 according to an embodiment of the present disclosure.

As shown in FIG. 3, E-MBS 300 is shown as having a first E-MBS zone 301 and a second E-MBS zone 303. The first E-MBS zone 301 includes BSs 305, 307, 309, 315, and 317 and other base stations. The second E-MBS zone 303 includes BSs 311 and 313 and other base stations.

According to an embodiment of the present disclosure, BSs 305-313 transmit a zone-edge indicator (e.g., a 1-bit field) that carries a positive value. The positive value of the zone-edge indicator would allow a mobile station at, for example, a location 319 in the coverage area of BS 307 to know that it is at an edge of the first E-MBS zone 301. Conversely, BSs 315 and 317 transmit a zone-edge indicator that carries a negative value. The negative value of the zone edge indicator would allow a mobile station at, for example, a location 321 to know that it is not at an edge of the first E-MBS zone 301.

In one embodiment, all of the base stations in a particular E-MBS zone may transmit the broadcast content using the same radio waveform and the same radio frequency (RF) resource (i.e., in a single frequency network (SFN) manner). However, the base stations may transmit different values as the zone-edge indicator. The zone-edge indicator serves the purpose of indicating whether a mobile station is at an edge of the current E-MBS zone.

In another embodiment, a mobile station starts at a location 323, passes through the location 321, and moves towards the location 319. At the location 323, the mobile station would detect a negative value for the zone-edge indicator, which would indicate that the mobile station is not at an edge of the first E-MBS zone 301. At the location 321, the mobile station would detect a soft value of either negative or positive for the zone-edge indicator, which would indicate that the mobile station is close to an edge of the first E-MBS zone 301. At the location 319, the mobile station would detect a positive value for the zone-edge indicator, which would indicate that the mobile station is at an edge of the first E-MBS zone 301. At which point, the mobile station may prepare for a zone handover to the second E-MBS zone 303 and execute the handover if the signal strength from the first E-MBS zone 301 is below a certain threshold.

In some embodiments, the mobile station would use the soft value for the zone-edge indicator to determine if any action by the mobile station is necessary. For example, if there is a high probability that the zone-edge indicator is of a negative value, the mobile station would determine that no inter-E-MBS zone handover is needed at that particular time. If there is a high probability that the zone-edge indicator is of a positive value, the mobile station would prepare and execute an inter-E-MBS zone handover if the signal strength of the present E-MBS zone is below a certain threshold. If there is a moderate probability that the zone-edge indicator is of a negative or positive value, the mobile station may take other appropriate actions, such as preparing for an inter-E-MBS zone handover.

Figure 4:
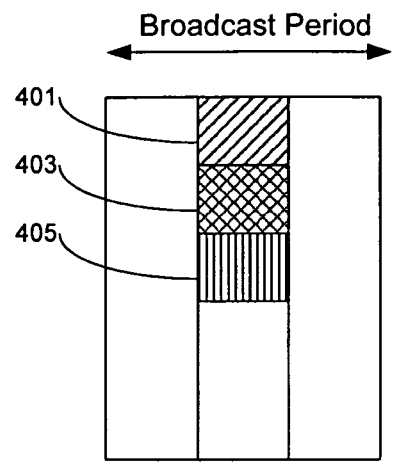
FIG. 4 illustrates a zone-edge indicator transmission associated with multiple E-MBS zones according to an embodiment of the present disclosure.

FIG. 4 illustrates a zone-edge indicator transmission associated with multiple E-MBS zones according to an embodiment of the present disclosure.

In this embodiment, a base station belonging to multiple E-MBS zones would broadcast a zone-edge indicator associated with each E-MBS zone. For example, if the base station belonged to three E-MBS zones, the base station would broadcast a zone-edge indicator for each E-MBS zone. As shown in FIG. 4, the base station may broadcast the zone-edge indicator for each E-MBS zone in a broadcast flow. For example, a zone-edge indicator 401 for the first E-MBS zone would appear in a broadcast flow along with a zone-edge indicator 403 for the second E-MBS zone and a zone-edge indicator 405 for the third E-MBS zone. In this case, a mobile station would take action only if there is a change in the value of the zone-edge indicator in the sub-frame of the E-MBS zone being monitored by the mobile station.

Figure 5:
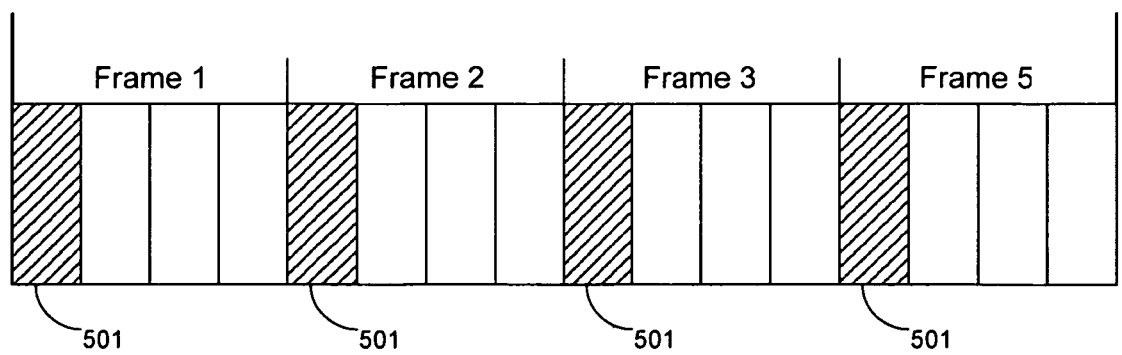
FIG. 5 illustrates a zone-edge indicator transmitted in a controlling signal that is associated with a particular channel according to an embodiment of the present disclosure.

FIG. 5 illustrates a zone-edge indicator transmitted in a controlling signal that is associated with a particular channel according to an embodiment of the present disclosure.

In this embodiment, the base station would transmit the zone-edge indicator in a controlling signal that is associated with a particular channel. For example, a base station is broadcasting on a certain broadcast channel in a certain sub-frame every 100 msec. In this case, the zone-edge indicator would be located in those specific sub-frames. As shown in FIG. 5, in this embodiment, a zone-edge indicator 501 is located in the first sub-frame of frames 1 to 4. A positive value of the zone-edge indicator would indicate to a mobile station that the current cell is at an edge of the E-MBS zone associated with the broadcast content.

In one embodiment, a base station would selectively broadcast zone information of a neighbor E-MBS zone. For example, BSs 305 to 309 in FIG. 3 would broadcast zone information of the second E-MBS zone 303. Similarly, BSs 311 and 313 would broadcast zone information of the first E-MBS zone 301. In this case, BSs 315 and 317 would not broadcast zone information of the second E-MBS zone 303 because they are not at the edge of the first E-MBS zone 301.

In another embodiment, the broadcast of the zone information of the neighbor E-MBS zone would be linked with the zone-edge indicator. In this case, a positive zone-edge indicator would prompt a mobile station to look for the zone information of the neighbor E-MBS zone.

Figure 6:
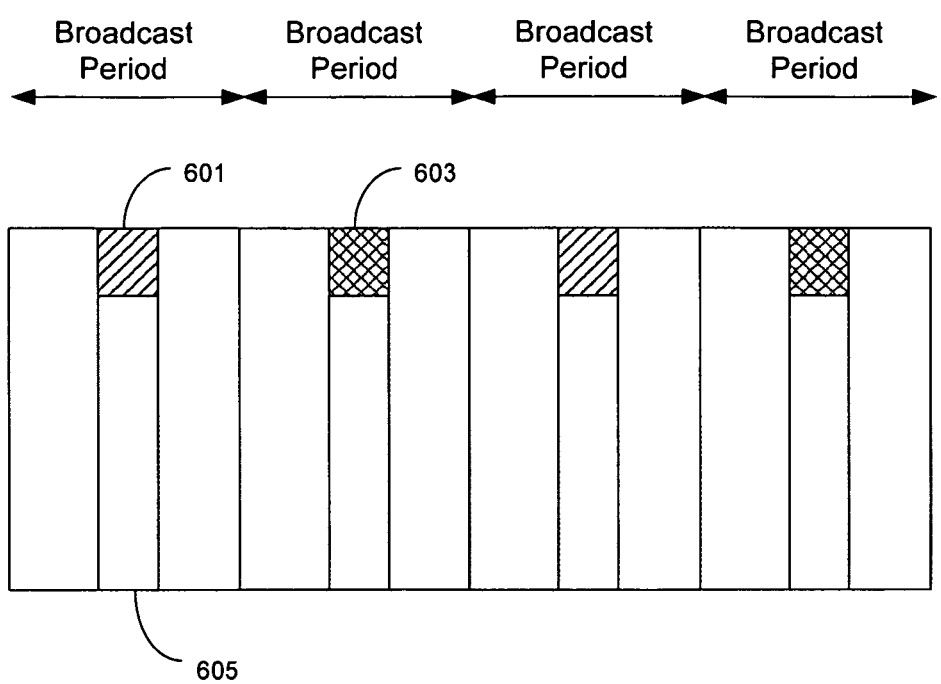
FIG. 6 illustrates the zone information of a neighbor E-MBS zone linked with other controlling signaling according to an embodiment of the present disclosure.

FIG. 6 illustrates the zone information of a neighbor E-MBS zone linked with other controlling signaling according to an embodiment of the present disclosure.

As shown in FIG. 6, the zone information of a neighbor E-MBS zone 601 is broadcasted in turn with the channel scheduling and/or channel mapping information 603 in a broadcast flow 605. The zone information of the neighbor E-MBS zone 601 can be broadcasted in turn with the channel scheduling and/or channel mapping information 603 because neither information experiences frequent changes.

Figure 7:
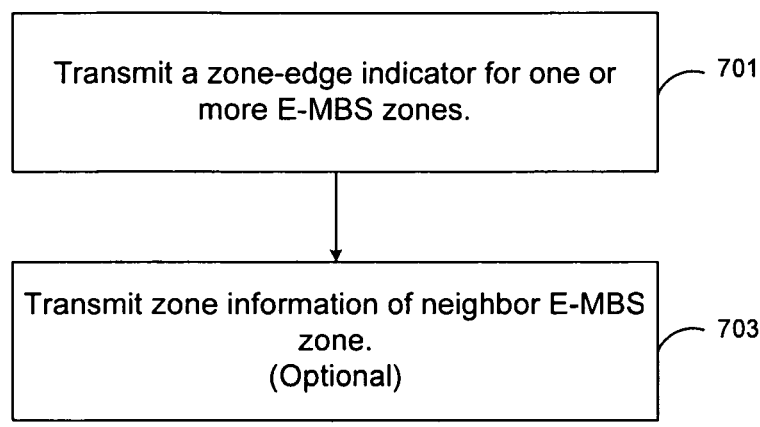
FIG. 7 illustrates a method of operating a base station according to an embodiment of the present disclosure.

FIG. 7 illustrates a method of operating a base station according to an embodiment of the present disclosure.

As shown in FIG. 7, a base station transmits a zone-edge indicator for one or more E-MBS zones at block 701. The zone-edge indicator allows a mobile station within the service area of the base station to determine if the mobile station is at an edge of a current E-MBS zone. In some embodiments, the zone-edge indicator is broadcasted in a controlling signal that is associated with a particular channel. Optionally, the base station may also transmit zone information of a neighbor E-MBS zone at block 703. The zone information of the neighbor E-MBS zone may be linked with the zone-edge indicator, so that a mobile station may look to the zone information of the neighbor E-MBS zone when the zone edge indicator indicates that the mobile station is at an edge of the current E-MBS zone. The zone information of the neighbor E-MBS zone also may be transmitted in turn with channel scheduling and/or channel mapping information.

Figure 8:
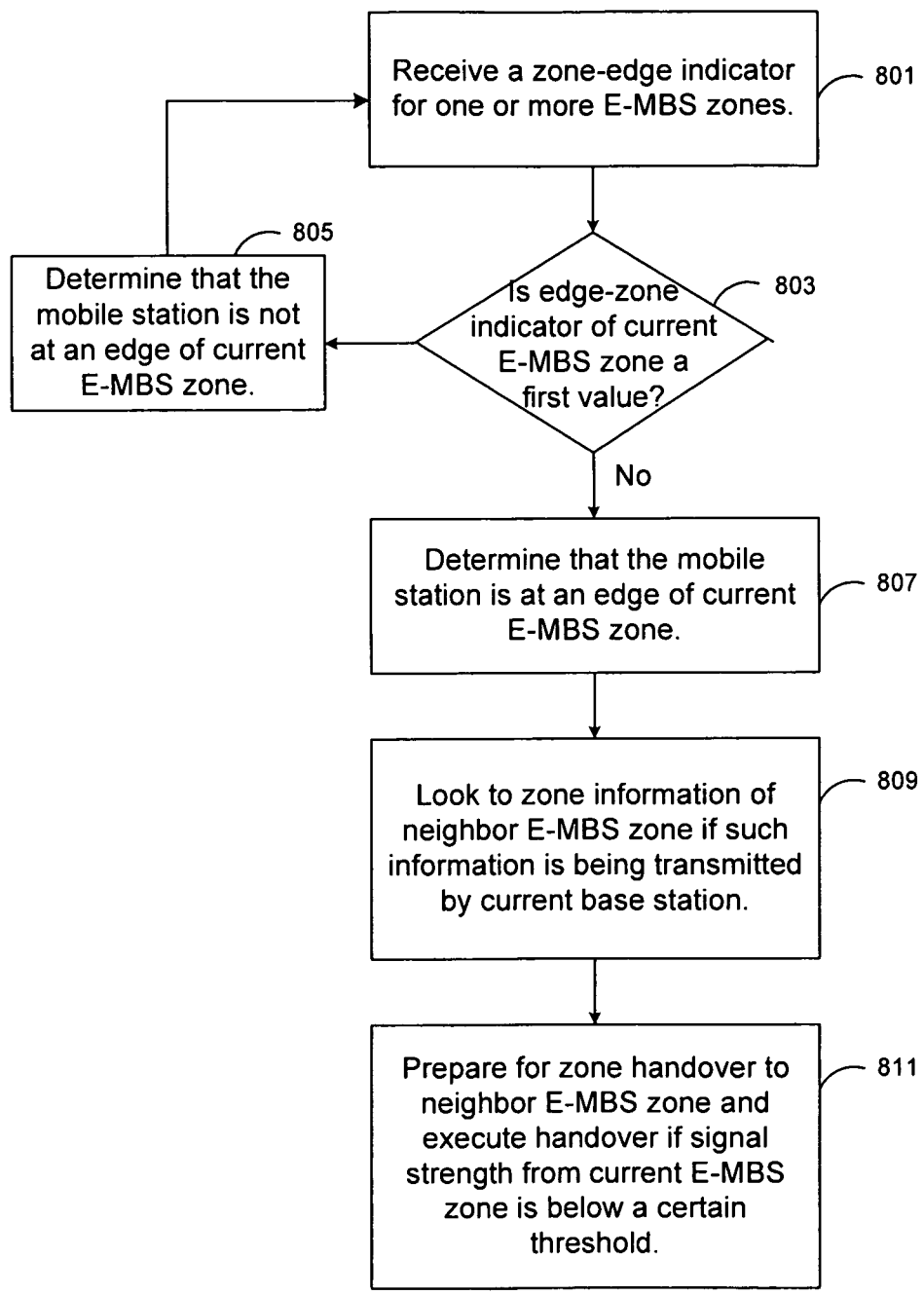
FIG. 8 illustrates a method of operating a mobile station according to an embodiment of the present disclosure.

FIG. 8 illustrates a method of operating a mobile station according to an embodiment of the present disclosure.

As shown in FIG. 8, a mobile station receives a zone-edge indicator for one or more E-MBS zones at block 801. If the zone-edge indicator for the current E-MBS zone is of a first value at block 803, the mobile station determines that the mobile station is not at an edge of the current E-MBS zone at block 805. If the zone-edge indicator is not of the first value (i.e., the zone-edge indicator is of a second value), the mobile station determines that the mobile station is at an edge of the current E-MBS zone at block 807. At block 809, the mobile station looks to the zone information of the neighbor E-MBS zone if such information is transmitted by the current base station. At block 811, the mobile station prepares for a zone handover to a neighbor E-MBS zone and executes the handover if the signal strength from the current E-MBS zone is below a certain threshold.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wireless communication network comprising a plurality of enhanced multicast broadcast system (E-MBS) zones, each E-MBS zone comprising a plurality of base stations, wherein at least one of the base stations in a specified E-MBS zone is configured to:
   broadcast a zone-edge indicator that indicates the proximity of the base station to an edge of the specified E-MBS zone to each of a plurality of mobile stations registered with the specified E-MBS zone,
   wherein if the base station is in both the specified E-MBS zone and a second E-MBS zone, the base station is further configured to broadcast a second zone-edge indicator that indicates the proximity of the base station to an edge of the second E-MBS zone,
   wherein the zone-edge indicator comprises one of a positive value indicating that the base station is at an edge of the specified E-MBS zone, a negative value indicating that the base station is not at an edge of the specified E-MBS zone, and a soft value indicating that the base station is close to an edge of the specified E-MBS zone.

2. The network of claim 1, wherein the at least one base station is configured to broadcast the zone-edge indicator in a controlling signal that is associated with a particular channel.

3. The network of claim 1, wherein the at least one base station is in more than two E-MBS zones and is further configured to broadcast a zone-edge indicator associated with each of the more than two E-MBS zones.

4. The network of claim 1, wherein the at least one base station is further configured to broadcast a zone information of a neighbor E-MBS zone.

5. The network of claim 4, wherein the zone information of the neighbor E-MBS zone is linked with the zone-edge indicator.

6. The network of claim 4, wherein the at least one base station is further configured to broadcast a common content multiple times and to include channel information and the zone information of the neighbor E-MBS zone in the common content alternatively in successive broadcasts.

7. A base station in a specified one of a plurality of enhanced multicast broadcast system (E-MBS) zones, each E-MBS zone comprising a plurality of base stations, wherein the base station is configured to:
   broadcast a zone-edge indicator that indicates the proximity of the base station to an edge of the specified E-MBS zone to each of a plurality of mobile stations registered with the specified E-MBS zone,
   wherein if the base station is in both the specified E-MBS zone and a second E-MBS zone, the base station is further configured to broadcast a second zone-edge indicator that indicates the proximity of the base station to an edge of the second E-MBS zone,
   wherein the zone-edge indicator comprises one of a positive value indicating that the base station is at an edge of the specified E-MBS zone, a negative value indicating that the base station is not at an edge of the specified E-MBS zone, and a soft value indicating that the base station is close to an edge of the specified E-MBS zone.

8. The base station of claim 7, wherein the base station is configured to broadcast the zone-edge indicator in a controlling signal that is associated with a particular channel.

9. The base station of claim 7, wherein the base station is in more than two E-MBS zones and is further configured to broadcast a zone-edge indicator associated with each of the more than two E-MBS zones.

10. The base station of claim 7, wherein the base station is further configured to broadcast a zone information of a neighbor E-MBS zone.

11. The base station of claim 10, wherein the zone information of the neighbor E-MBS zone is linked with the zone-edge indicator.

12. The base station of claim 10, wherein the base station is further configured to broadcast a common content multiple times and to include channel information and the zone information of the neighbor E-MBS zone in the common content alternatively in successive broadcasts.

13. A method of operating a base station in a specified one of a plurality of enhanced multicast broadcast system (E-MBS) zones, each E-MBS zone comprising a plurality of base stations, the method comprising:
   broadcasting a zone-edge indicator that indicates the proximity of the base station to an edge of the specified E-MBS zone to each of a plurality of mobile stations registered with the specified E-MBS zone; and
   if the base station is in both the specified E-MBS zone and a second E-MBS zone, broadcasting a second zone-edge indicator that indicates the proximity of the base station to an edge of the second E-MBS zone,
   wherein the zone-edge indicator comprises one of a positive value indicating that the base station is at an edge of the specified E-MBS zone, a negative value indicating that the base station is not at an edge of the specified E-MBS zone, and a soft value indicating that the base station is close to an edge of the specified E-MBS zone.

14. The method of claim 13, wherein broadcasting the zone-edge indicator comprises broadcasting the zone-edge indicator in a controlling signal that is associated with a particular channel.

15. The method of claim 13, wherein the base station is in more than two E-MBS zones, and the method further comprises broadcasting a zone-edge indicator associated with each of the more than two E-MBS zones.

16. The method of claim 13, further comprising broadcasting a zone information of a neighbor E-MBS zone.

17. The method of claim 16, wherein the zone information of the neighbor E-MBS zone is linked with the zone-edge indicator.

18. The method of claim 16, further comprising broadcasting a common content multiple times, wherein broadcasting a zone information of a neighbor E-MBS zone comprises including channel information and the zone information of the neighbor E-MBS zone in the common content alternatively in successive broadcasts.

19. A mobile station capable of being registered with a current enhanced multicast broadcast system (E-MBS) zone, each E-MBS zone comprising a plurality of base stations, wherein the mobile station is configured to:
receive a broadcast from a base station in the current E-MBS zone, wherein the broadcast comprises a zone-edge indicator; and
determine the proximity of the mobile station to an edge of the current E-MBS zone based upon a value of the zone-edge indicator,
wherein if the broadcast comprises a plurality of zone-edge indicators, the mobile station is configured to monitor a specified one of the zone-edge indicators that corresponds to the current E-MBS zone and to determine the proximity of the mobile station to an edge of the current E-MBS zone based on the monitored zone-edge indicator,
wherein the mobile station is further configured to determine that the mobile station is not at an edge of the current E-MBS zone when the zone-edge indicator comprises a negative value and to determine that the mobile station is at an edge of the current E-MBS when the zone-edge indicator comprises a positive value,
wherein the mobile station is further configured to determine that the mobile station is close to an edge of the current E-MBS zone when the zone-edge indicator comprises a soft value.

20. The mobile station of claim 19, wherein if the mobile station determines that the zone-edge indicator comprises a positive value, the mobile station is further configured to prepare for a zone handover to a neighbor E-MBS zone and execute the handover if the signal strength from the current E-MBS zone is below a certain threshold.

21. The mobile station of claim 19, wherein if the mobile station determines that the zone-edge indicator comprises a positive value, the mobile station is further configured to look to a zone information of a neighbor E-MBS zone if such information is transmitted by the base station.

* * * * *